(12) United States Patent
Wentink

(10) Patent No.: US 8,594,122 B2
(45) Date of Patent: Nov. 26, 2013

(54) TRANSMIT ANNOUNCEMENT INDICATION

(75) Inventor: Menzo Wentink, Utrecht (NL)

(73) Assignee: Intellectual Ventures I LLC, Wilmington, DE (US)

( * ) Notice: Subject to any disclaimer, the term of this patent is extended or adjusted under 35 U.S.C. 154(b) by 1248 days.

(21) Appl. No.: 11/627,181

(22) Filed: Jan. 25, 2007

(65) Prior Publication Data

US 2007/0190942 A1 Aug. 16, 2007

Related U.S. Application Data

(60) Provisional application No. 60/762,425, filed on Jan. 25, 2006.

(51) Int. Cl.
*H04L 12/413* (2006.01)
(52) U.S. Cl.
USPC .......................................... 370/447; 370/445
(58) Field of Classification Search
USPC .............. 370/328, 336, 338, 310, 310.2, 350, 370/431, 443, 444, 433, 448, 445, 465, 474, 370/447; 455/41.2, 69, 91, 296
See application file for complete search history.

(56) References Cited

U.S. PATENT DOCUMENTS

| 5,844,905 | A | 12/1998 | McKay et al. | |
|---|---|---|---|---|
| 6,349,210 | B1* | 2/2002 | Li | 455/450 |
| 6,842,460 | B1 | 1/2005 | Olkkonen et al. | |
| 7,130,306 | B1* | 10/2006 | Loukas | 370/392 |
| 2003/0231608 | A1 | 12/2003 | Wentink | |
| 2004/0196871 | A1 | 10/2004 | Terry | |
| 2005/0025131 | A1 | 2/2005 | Ko et al. | |
| 2005/0050219 | A1 | 3/2005 | Choi et al. | |
| 2005/0059347 | A1 | 3/2005 | Haartsen | |
| 2005/0114749 | A1* | 5/2005 | Yonge et al. | 714/752 |
| 2005/0124294 | A1 | 6/2005 | Wentink | |
| 2005/0147115 | A1* | 7/2005 | Li et al. | 370/449 |
| 2005/0208956 | A1* | 9/2005 | Takagi et al. | 455/464 |
| 2005/0243781 | A1* | 11/2005 | Vesuna et al. | 370/338 |
| 2005/0243849 | A1 | 11/2005 | Wentink | |
| 2005/0249244 | A1* | 11/2005 | McNamara et al. | 370/474 |
| 2005/0265393 | A1* | 12/2005 | Fischer et al. | 370/474 |
| 2006/0116076 | A1* | 6/2006 | Li et al. | 455/41.2 |
| 2006/0187964 | A1* | 8/2006 | Li et al. | 370/474 |
| 2007/0025388 | A1* | 2/2007 | Abhishek et al. | 370/447 |
| 2007/0080781 | A1* | 4/2007 | Ginzburg et al. | 340/7.21 |

(Continued)

FOREIGN PATENT DOCUMENTS

| JP | 2003-009220 | 1/2003 |
|---|---|---|
| JP | 2004-128654 | 4/2004 |

(Continued)

OTHER PUBLICATIONS

International Preliminary Report on Patentability for PCT/US2007/61058, completed Dec. 18, 2009.
Office Action on Japanese Application 2008-552579, dated Aug. 30, 2011 (English translation not available).

(Continued)

*Primary Examiner* — Abdullah Riyami

(57) ABSTRACT

Systems and methods for transmission announcement indication are disclosed. A transmission announcement indication is provided for use inside a communications frame addressed to a destination as an indication that another transmission for that same destination will follow.

42 Claims, 10 Drawing Sheets

(56) References Cited

U.S. PATENT DOCUMENTS

| | | | |
|---|---|---|---|
| 2007/0115882 A1* | 5/2007 | Wentink | 370/329 |
| 2007/0280192 A1* | 12/2007 | Yagyu et al. | 370/349 |
| 2008/0039046 A1* | 2/2008 | Vilzmann et al. | 455/296 |
| 2008/0298306 A1* | 12/2008 | Larsson | 370/328 |
| 2010/0142493 A1* | 6/2010 | Sakoda et al. | 370/336 |

FOREIGN PATENT DOCUMENTS

| | | |
|---|---|---|
| KR | 200513872 | 2/2005 |
| KR | 200523940 | 3/2005 |
| WO | WO-01/31881 | 5/2001 |
| WO | WO 03/096627 | 11/2003 |
| WO | WO-2005/041467 | 5/2005 |
| WO | WO-2005/112488 | 11/2005 |

OTHER PUBLICATIONS

Anonymous Ed—Anonymous: "Information technology—Telecommunications and information exchange between systems—Local and metropolitan area networks—Specific requirements—Part 11: Wireless LAN Media Access Control (MAC) and Physical Layer (PHY) Specifications," IEEE Standard, Jan. 1, 2003, 528 pages.

Extended Search Report issued on EP Application 07717414.2, dated Jun. 21, 2012.

Office Action on Chinese Application 200780003618.1, dated May 3, 2012, English translation not available.

International Search Report and Written Opinion, Nov. 1, 2007.

Office Action on Japanese Application 2008-552579, mailed Mar. 13, 2012 (English translation not available).

Examination Report on EP Application 07717414.2, mailed Jun. 10, 2013.

* cited by examiner

TRANSMIT ANNOUNCEMENT INDICATION

CROSS-REFERENCE TO RELATED APPLICATION

This application claims priority to copending U.S. provisional application entitled, "Tx Announcement," having Ser. No. 60/762,425, filed Jan. 25, 2006, which is entirely incorporated herein by reference.

TECHNICAL FIELD

The present disclosure is generally related to communications and, more particularly, is related to systems and methods for wireless network communications.

BACKGROUND

Communication networks come in a variety of forms. Notable networks include wireline and wireless. Wireline networks include local area networks (LANs), DSL networks, and cable networks, among others. Wireless networks include cellular telephone networks, classic land mobile radio networks and satellite transmission networks, among others. These wireless networks are typically characterized as wide area networks. More recently, wireless local area networks and wireless home networks have been proposed, and standards, such as Bluetooth and IEEE 802.11, have been introduced to govern the development of wireless equipment for such localized networks.

A wireless local area network (WLAN) typically uses infrared (IR) or radio frequency (RF) communications channels to communicate between portable or mobile computer terminals and stationary access points or base stations. These access points are, in turn, connected by a wired or wireless communications channel to a network infrastructure which connects groups of access points together to form the LAN, including, optionally, one or more host computer systems.

Wireless protocols such as Bluetooth and IEEE 802.11 support the logical interconnections of such portable roaming terminals having a variety of types of communication capabilities to host computers. The logical interconnections are based upon an infrastructure in which at least some of the terminals are capable of communicating with at least two of the access points when located within a predetermined range, each terminal being normally associated, and in communication, with a single one of the access points. Based on the overall spatial layout, response time, and loading requirements of the network, different networking schemes and communication protocols have been designed so as to most efficiently regulate the communications.

IEEE Standard 802.11 ("802.11") is set out in "Wireless LAN Medium Access Control (MAC) and Physical Layer (PHY) Specifications" and is available from the IEEE Standards Department, Piscataway, N.J. 802.11 permits either IR or RF communications at 1 Mbps, 2 Mbps and higher data rates, a medium access technique similar to carrier sense multiple access/collision avoidance (CSMA/CA), a power-save mode for battery-operated mobile stations, seamless roaming in a full cellular network, high throughput operation, diverse antenna systems designed to eliminate "dead spots," and an easy interface to existing network infrastructures.

As communication devices become smaller, while providing increasing functionality, increasing transmission speed without dramatically affecting overhead raises significant design challenges. Thus, a heretofore unaddressed need exists in the industry to address the aforementioned deficiencies and inadequacies.

SUMMARY

Embodiments of the present disclosure provide a system of transmission announcement indication. Briefly described, in architecture, one embodiment of the system, among others, can be implemented as a transmitter configured to transmit a first communication frame from a first station to a second station; and provide a transmit announcement indication in the communications frame, the transmit announcement indication indicating whether a second communication frame to the second station will follow the first communication frame.

Embodiments of the present disclosure can also be viewed as providing methods for transmission announcement indication. In this regard, one embodiment of such a method, among others, can be broadly summarized by the following steps: transmitting a first communication frame from a first station to a second station; providing a transmit announcement indication in the communications frame, the transmit announcement indication indicating whether a second communication frame to the second station will follow the first communication frame.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Disclosed herein are various communication system and method embodiments. Such communication systems comprise, in one exemplary embodiment, an access point and one or more client devices that enable an exchange of transmission announcement indications. To increase data rates on portable wireless local area network (WLAN) clients, the 802.11 specification provides for transmission announcement operations on client devices. Transmission announcement operations may be performed in any type of processor such as a MAC layer processor, though not limited to a MAC layer processor, including, but not limited to, a digital signal processor (DSP), a microprocessor unit (MCU), a general purpose processor, and an application specific integrated circuit (ASIC), among others. Because certain embodiments of communication systems that provide for the exchange of transmission announcement indication are described herein in the context of an 802.11n system, a brief description of 802.11 and layers in a wireless LAN (WLAN) follows with the understanding that the disclosed systems and methods may similarly apply to other communications systems.

IEEE 802.11n (the "802.11n proposal") is a high data rate extension of the 802.11a standard at 5 gigahertz (GHz) and 802.11g at 2.4 GHz. Both of these standards use orthogonal frequency division multiplexing (OFDM), which is a signaling scheme which uses multiple, parallel tones to carry the information. These tones are commonly called subcarriers. It is noted that, at the present time, the 802.11n proposal is only a proposal and is not yet a completely defined standard. Other applicable standards include Bluetooth, xDSL, WiMAX, other sections of 802.11, etc. To increase the data rate, 802.11n is considering using a transmission announcement indication.

Figure 1:
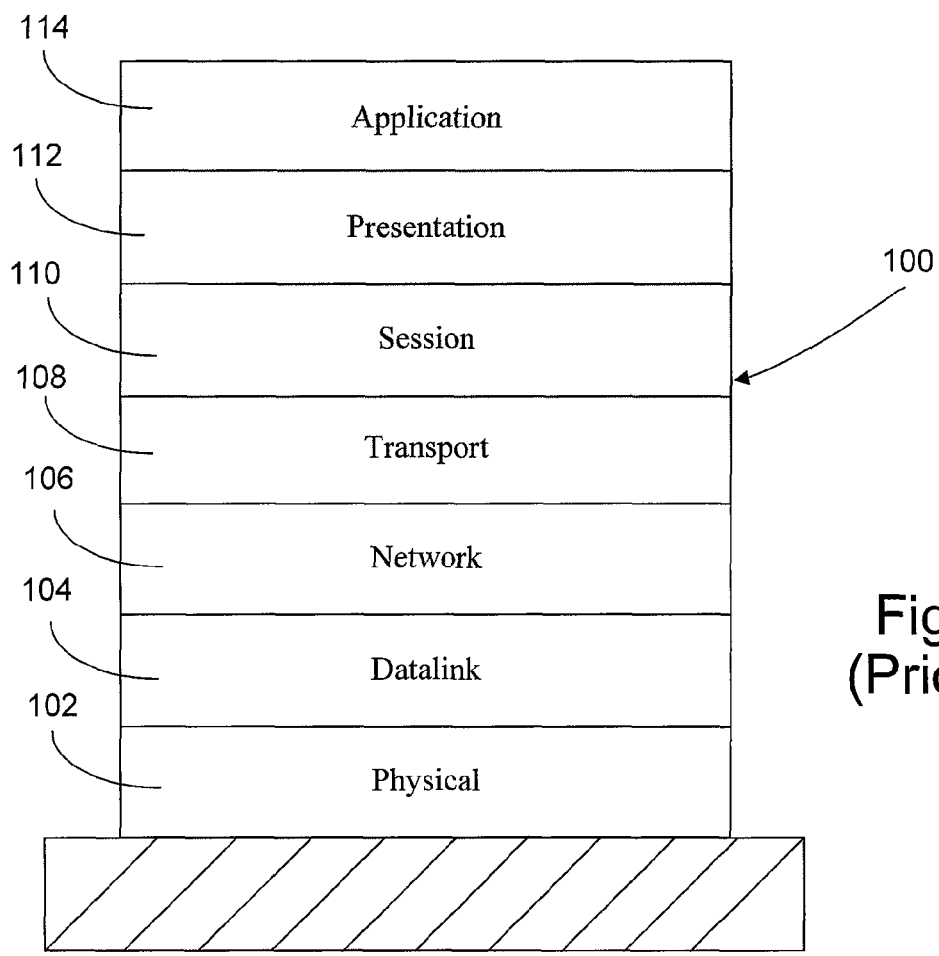
FIG. 1 is a block diagram of an open system interconnection (OSI) layered model for data transmission.

IEEE 802.11 is directed to wireless LANs, and in particular specifies the MAC and the PHY layers. These layers are intended to correspond closely to the two lowest layers of a system based on the ISO Basic Reference Model of OSI, i.e., the data link layer and the physical layer. FIG. 1 shows a diagrammatic representation of an open systems interconnection (OSI) layered model 100 developed by the International Organization for Standards (ISO) for describing the exchange of information between layers in communication networks. The OSI layered model 100 is particularly useful for separating the technological functions of each layer, and thereby facilitating the modification or update of a given layer without detrimentally impacting on the functions of neighboring layers.

At a lower most layer, the OSI model 100 has a physical layer or PHY layer 102 that is responsible for encoding and decoding data into signals that are transmitted across a particular medium. Above the PHY layer 102, a data link layer 104 is defined for providing reliable transmission of data over a network while performing appropriate interfacing with the PHY layer 102 and a network layer 106. The network layer 106 is responsible for routing data between nodes in a network, and for initiating, maintaining and terminating a communication link between users connected to the nodes. A transport layer 108 is responsible for performing data transfers within a particular level of service quality. A session layer 110 is generally concerned with controlling when users are able to transmit and receive data. A presentation layer 112 is responsible for translating, converting, compressing and decompressing data being transmitted across a medium. Finally, an application layer 114 provides users with suitable interfaces for accessing and connecting to a network.

Figure 2:
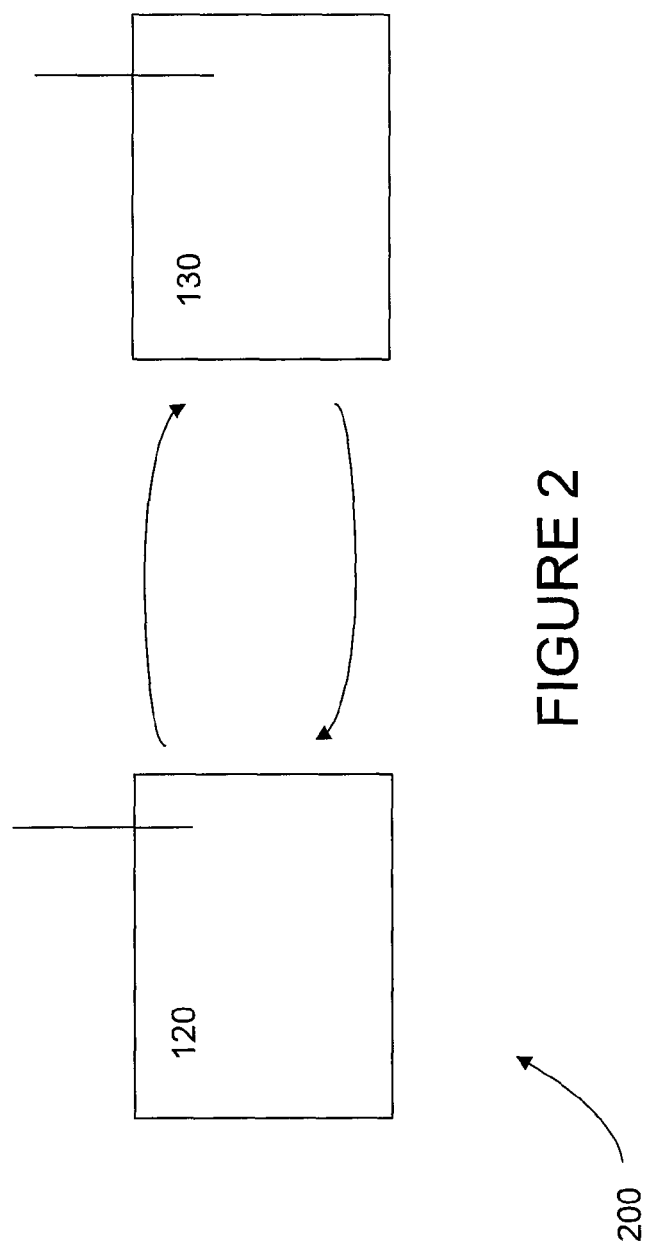
FIG. 2 is a diagram of an exemplary embodiment of a communication system comprising two stations using the OSI model of FIG. 1

This OSI model 100 can be useful for transmissions between, for example, two stations, 120, 130 as shown in FIG. 2 and an access point (AP). An embodiment of a communication system 200 is shown that provides for transmission announcement indication, and, in one embodiment, is configured as a wireless ad hoc network (IBSS). An IBSS is a group of 802.11 stations such as stations 120, 130 communicating with one another. Stations 120, 130 of communication system 200 may comprise transceivers for transmitting and receiving data streams between stations 120, 130, and may include multiple antennas for receiving and/or transmitting. Stations 120, 130 may comprise two client stations or a client station and an AP. Stations 120, 130 do not necessarily have the same number of antennas. Stations 120, 130 may transmit using, as non-limiting examples, a time division multiple access (TDMA) protocol or a Carrier Sense Multiple Access with Collision Avoidance (CSMA/CA) protocol, or a combination of the same and/or other protocols. Although only two stations are provided in this example, the disclosed principles of transmission announcement indication are also applicable to larger networks with more devices. Certain embodiments of the transmission announcement indication systems and methods may also be implemented as a basic service set (BSS). A BSS is a group of 802.11 stations with a central access point (AP). An AP may be the central access point for a plurality of stations in a BSS.

In some embodiments, each station 120, 130 comprises a PHY signal processor configured to implement communications operations, in addition to performing transmission announcement indication. That is, each PHY signal processor, alone, or in combination with other logic or components, implements the functionality of the various embodiments. Functionality of transmission announcement indication systems and methods may be embodied in a wireless radio, or other communication device. Such a communication device may include many wireless communication devices, including computers (desktop, portable, laptop, etc.), consumer electronic devices (e.g., multi-media players), compatible telecommunication devices, personal digital assistants (PDAs), or any other type of network devices, such as printers, fax machines, scanners, hubs, switches, routers, set-top boxes, televisions with communication capability, etc.

A transmission announcement (TxA) comprises an indication in a transmission frame transmitted from station 120, for example, which is addressed to a certain destination, station 130, for example, that another transmission for that same destination, station 130, will follow. The indicated transmission does not need to include a MAC destination address because the transmission announcement indication was set on the preceding transmission to that station.

The transmission indicated by the TxA indication could be a PHY header without MAC portion, which may also be referred to as a zero-length frame (ZLF) or Null Data Packet (NDP). A ZLF may be transmitted to sound the channel between sender station 120 and responder station 130. The transmission indicated by the TxA indication may start after the receiver sends a possible response frame to the frame where the TxA indication is included. The transmission indicated by the TxA indication may also start after the frame where the TxA indication is included, before the receiver sends a possible response frame. The indicated transmission may start after a short inter frame space (SIFS), but there is no strict requirement on the timing. SIFS is used to separate transmissions belonging to a single dialog (e.g., fragment-acknowledge), and is the minimum inter frame space, and there is at most one single station to transmit at this given time, hence having priority over all other stations.

SIFS is a fixed value designated in the PHY and is calculated in such a way that the transmitting station is able to switch back to receive mode and is capable of decoding the incoming packet. However, if the interval is longer than SIFS (or point coordination inter frame space (PIFS)), there is a risk that a transmission from another node will get interspersed, in which case this frame then falsely gets interpreted as the indicated transmission. The transmission announcement can be a bit inside a MAC header field, such as the HT-control field.

Figure 3:
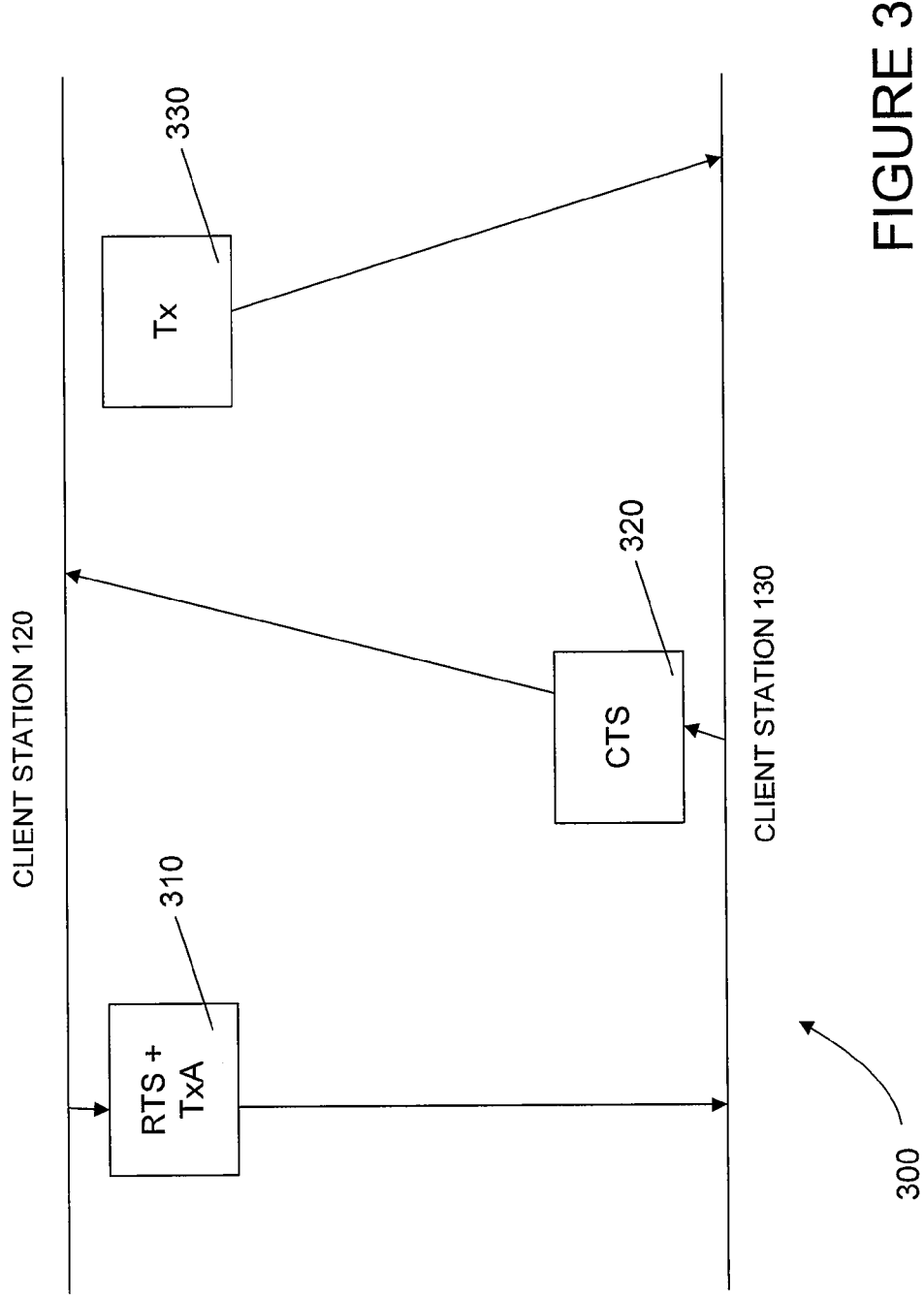
FIG. 3 is a block diagram of an exemplary embodiment of a system of transmission announcement indication with RTS and CTS frames using the communication system of FIG. 2.

System 300 embodying a TxA indication is illustrated in FIG. 3. A ready to send (RTS) (herein also referred to as an RTS frame) with a TxA indication is transmitted from station 120 to station 130. The RTS and TxA indication may be followed by a clear to send (CTS) (herein also referred to as an CTS frame) response from station 130 to station 120, after which the announced transmission from station 120 to station 130 follows. Station 120 sends an RTS with TxA 310 to station 130. Station 130 sends CTS 320 in response to the RTS+TxA 310. Station 130 receives the next transmission 330 as announced by the TxA indication portion of RTS+TxA 310. In this exemplary embodiment, the announced transmission occurs when station 120 gains control over the medium.

Figure 4:
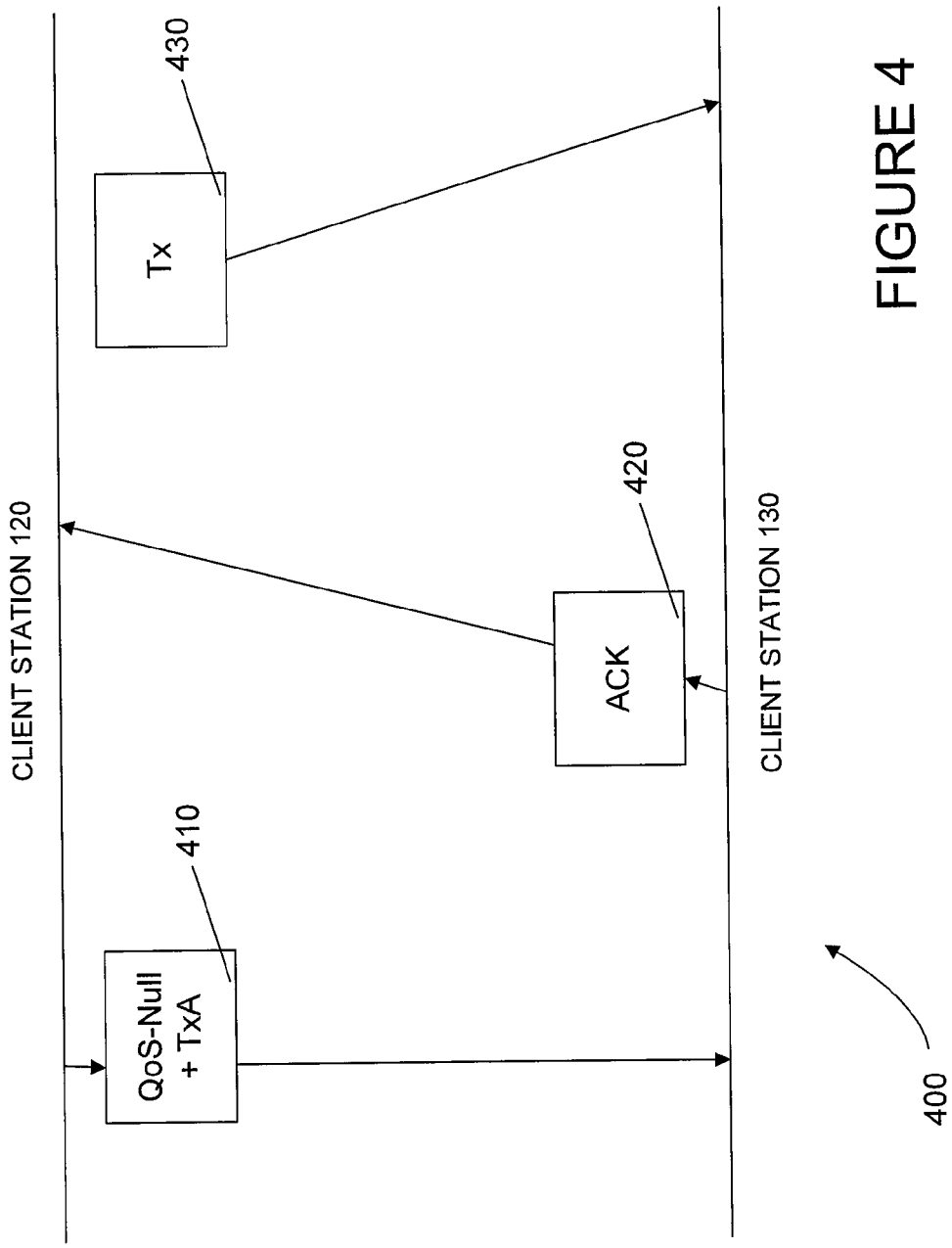
FIG. 4 is a block diagram of an exemplary embodiment of a system of transmission announcement indication with QoS-null and ACK frames using the communication system of FIG. 2.

FIG. 4 provides an alternative embodiment of systems and methods of TxA indication. A QoS-null with TxA indication is followed by an acknowledgement (ACK) response, after which the announced transmission follows. QoS-Null is a quality of service (QoS) Null frame with a QoS subheader as part of the MAC header. The QoS subheader (called QoS control field) contains bits which can be used to signal no-ACK policy. Station 120 sends a QOS-null with a TxA indication to station 130. Station 130 sends an ACK in response to the QOS-null. Station 130 receives the next transmission 430 as announced by the TxA indication. Similar to the exemplary embodiment of FIG. 3, the announced transmission occurs when station 120 gains control over the medium.

Figure 5:
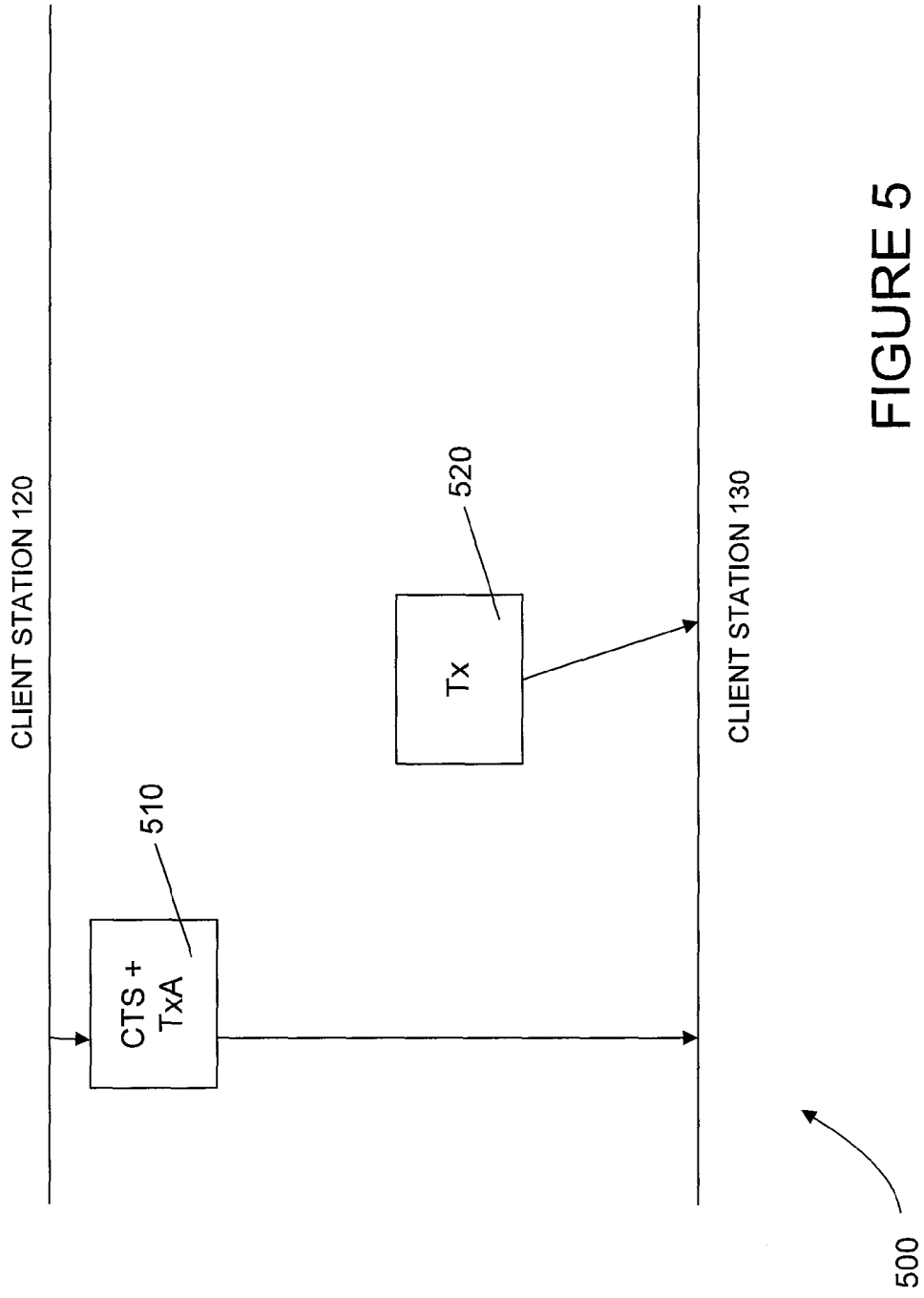
FIG. 5 is a block diagram of an exemplary embodiment of a system of transmission announcement indication with CTS frames using the communication system of FIG. 2.

FIG. 5 provides an illustration of the TxA indication. The announced transmission follows after the CTS. Station 120 sends a CTS with TxA 510 to station 130. Station 130 receives the next transmission 520 as announced by the TxA indication. In this exemplary embodiment, station 130 may gain control over the medium after the transmission announced in the CTS, even when the existing frame exchange sequence would dictate otherwise. This embodiment may be applied to other frame types as well, in which case the announced transmission follows substantially immediately (i.e., SIFS) after the frame which announces it, with the effect of postponing a potential SIFS response until after the announced transmission. In the exemplary embodiments as provided in FIG. 3 and FIG. 4, the transmission announced in the CTS may follow SIFS after a possible transmission by the receiver of the CTS.

Figure 6:
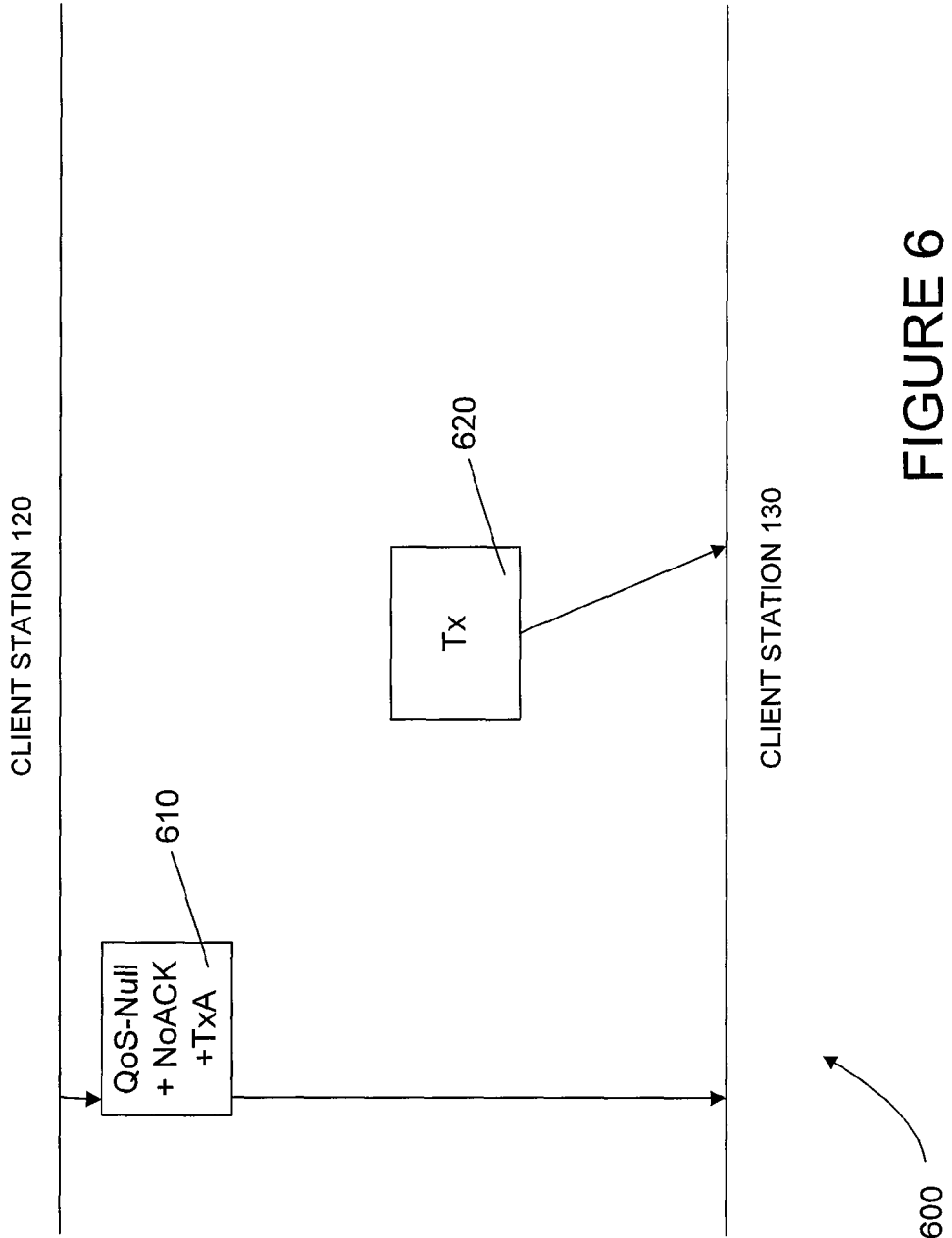
FIG. 6 is a block diagram of an exemplary embodiment of a system of transmission announcement indication with QoS-null and NoACK using the communication system of FIG. 2.

FIG. 6 provides an exemplary embodiment of a TxA indication. The announced transmission follows after the QOS-null with no ACK policy, because there is no response frame to a frame with no ACK policy. Station 120 sends a QOS-null frame with a TxA indication 610 to station 130, indicating no ACK policy. Station 130 receives the next transmission 620 as announced by the TxA indication.

Besides these examples, a TxA indication could be present in other frames as well, such as data frames, null frames, management frames, control frames, QoS frames, etc. A response may be interspersed between the frame carrying the TxA indication and the announced transmission. The announced transmission itself may or may not provoke an acknowledgement.

Figure 7:
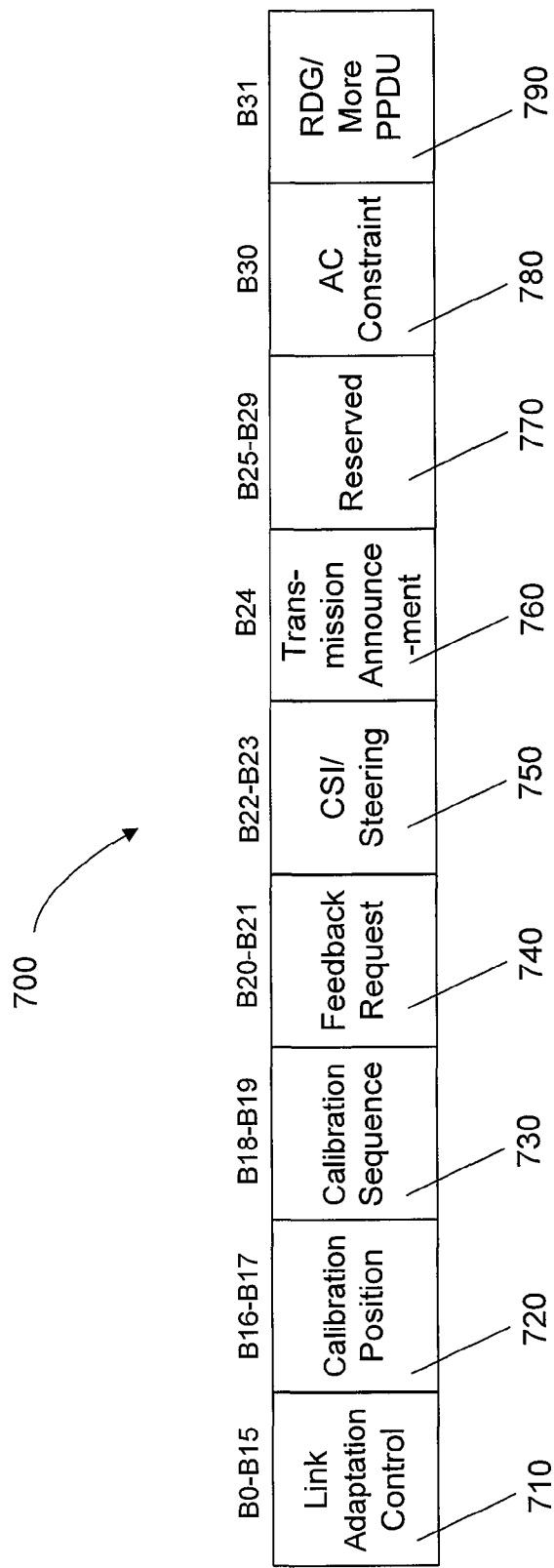
FIG. 7 is a block diagram of an exemplary embodiment of a control word for use in an exemplary embodiment of a system of transmission announcement indication using the communication system of FIG. 2.

In one exemplary embodiment, a TxA indication bit is located at bit 24 of a high throughput (HT)-control field as illustrated in FIG. 7. FIG. 7 provides the 32-bit HT-control field with TxA bit. Bits 0-15 comprise link adaptation control 710. Bits 16-17 comprise calibration position 720. Bits 18-19 comprise calibration sequence 730. Bits 20-21 comprise feedback request 740. Bits 22-23 comprise CSI/steering 750. Bit 24 is TxA 760. Bits 25-29 comprise reserved bits 770. Bit 30 comprises AC constraint 780. Bit 31 comprises RDG/More PPDU 790.

In an exemplary embodiment, a TxA announcement frame precedes the ZLF. For instance, a QoS-null with HT-control field, where bit 24 of the HT-control field is used to indicate that this is a TxA announcement (bit 24 is currently reserved) indicates that this is a TxA. The ZLF follows within an SIFS for no ACK or SIFS after the ACK for immediate ACK. In another exemplary embodiment a management action frame may be utilized.

Figure 8:
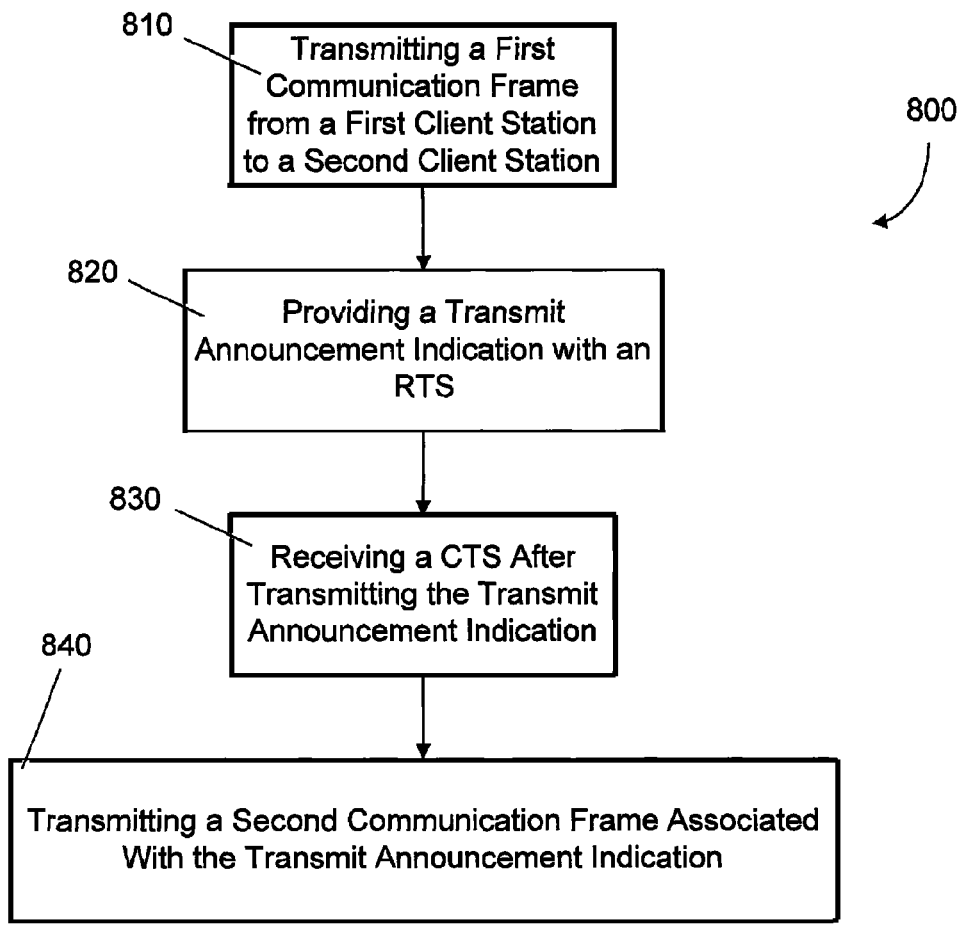
FIG. 8 is a flow chart of a method embodiment comprising transmission announcement indication of the communication system of FIG. 2.

FIG. 8 provides flowchart 800 for an exemplary embodiment of a method of transmission announcement indication. In block 810, a first communication frame is transmitted from a first station to a second station. In block 820, a transmission announcement indication is provided with an RTS. In block 830, a CTS is received after transmitting the transmission announcement indication. In block 840, a second communication frame associated with the transmit announcement indication is transmitted.

Figure 9:
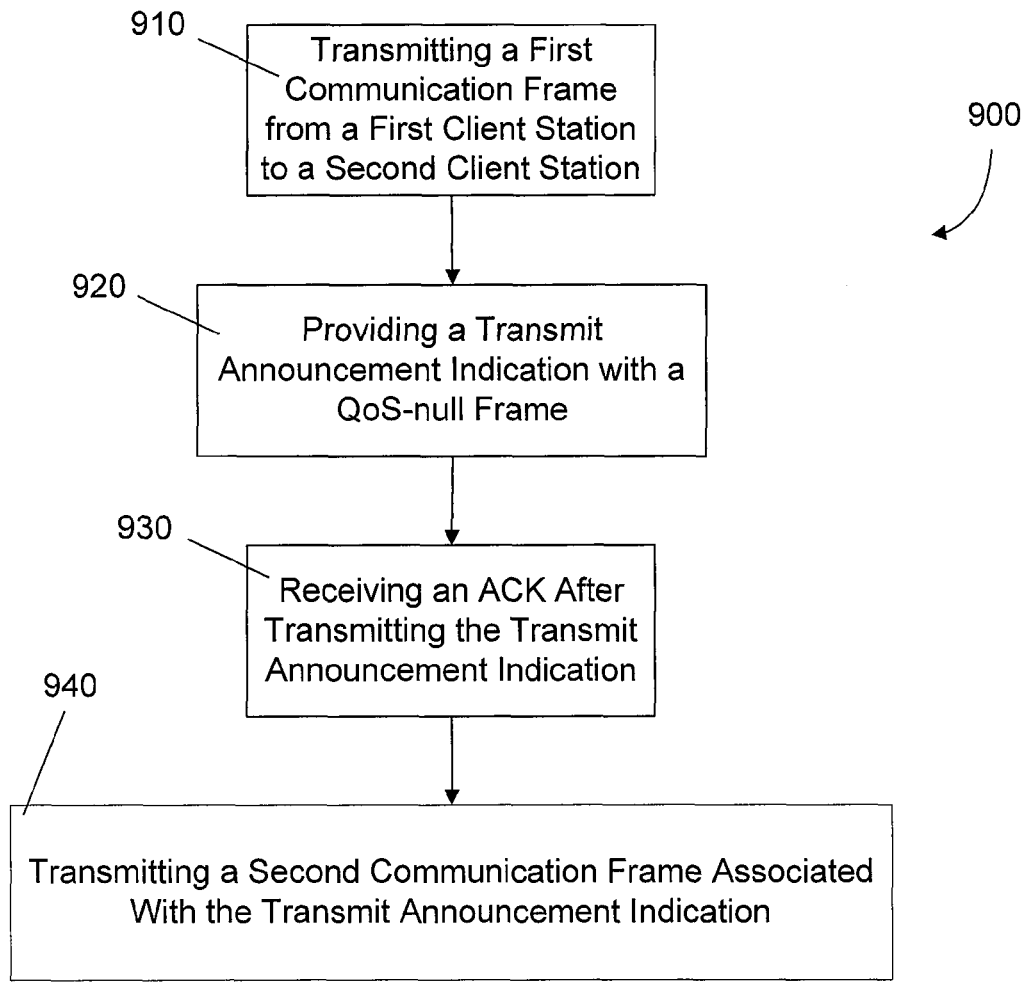
FIG. 9 is a flow chart of a method embodiment comprising transmission announcement indication of the communication system of FIG. 2.

FIG. 9 provides flowchart 900 for an exemplary embodiment of a method of transmission announcement indication. In block 910, a first communication frame is transmitted from a first station to a second station. In block 920, a transmission announcement indication is provided with a QoS-null frame. In block 930, an acknowledge frame is received after transmitting the transmission announcement indication. In block 940, a second communication frame associated with the transmit announcement indication is transmitted.

Figure 10:
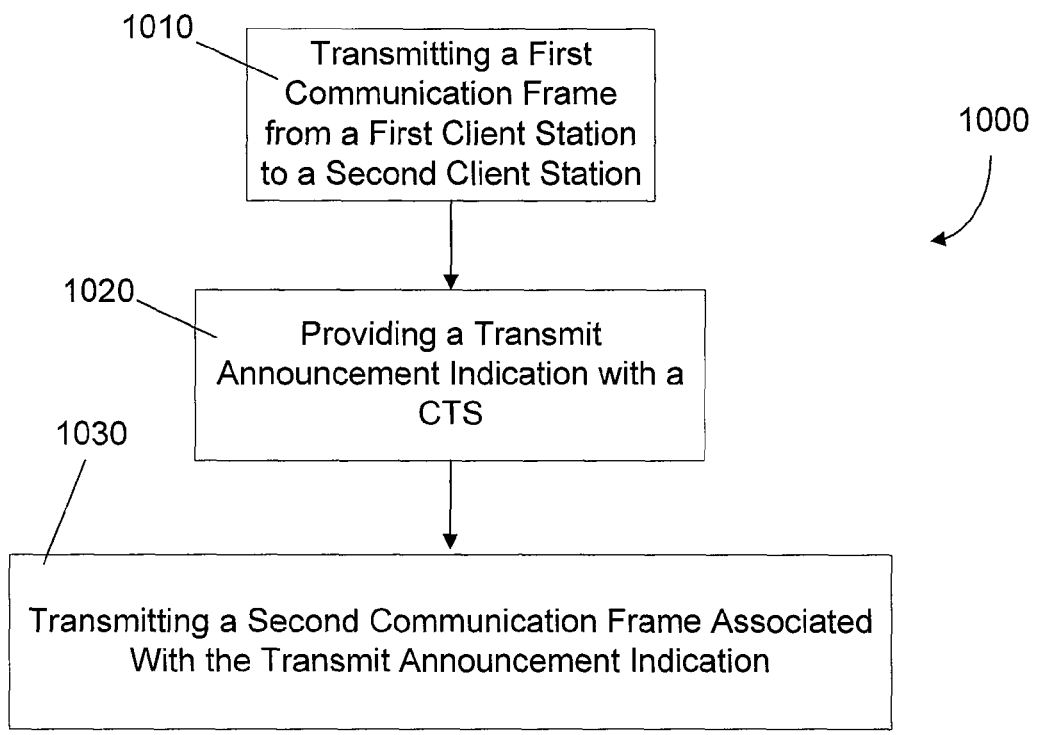
FIG. 10 is a flow chart of a method embodiment comprising transmission announcement indication of the communication system of FIG. 2.

FIG. 10 provides flowchart 1000 for an exemplary embodiment of a method of transmission announcement indication. In block 1010, a first communication frame is transmitted from a first station to a second station. In block 1020, a transmission announcement indication is provided with a CTS. In block 1030, a second communication frame associated with the transmit announcement indication is transmitted.

Embodiments of the present disclosure can be implemented in hardware, software, firmware, or a combination thereof. In the embodiment(s), the TxA indication is implemented in software or firmware that is stored in a memory and that is executed by a suitable instruction execution system. If implemented in hardware, as in an alternative embodiment, the TxA indication can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

The TxA indication program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory. In addition, the scope of the present disclosure includes embodying the functionality of the preferred embodiments of the present disclosure in logic embodied in hardware or software-configured mediums.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

Therefore, at least the following is claimed:

1. A method comprising:
   transmitting a first communication frame from a first station to a second station;
   wherein the first communication frame comprises an address of the second station and a transmit announcement indication indicating that a second communication frame intended for the second station will follow the first communication frame and that the second communication frame will not include the address of the second station, and wherein the second communication frame follows after a short inter frame space (SIFS) after the first communication frame with the transmit announcement indication.

2. The method of claim 1, wherein the transmit announcement indication comprises a zero-length frame.

3. The method of claim 1, wherein transmitting the first communication frame comprises providing the transmit announcement indication with a request to send (RTS) frame.

4. The method of claim 3, further comprising receiving, by the first station, a clear to send (CTS) frame from the second station after the first station has transmitted the transmit announcement indication with the RTS frame.

5. The method of claim 4, further comprising transmitting the second communication frame from the first station to the second station, wherein the second communication frame does not include the address of the second station.

6. The method of claim 1, wherein transmitting the first communication frame comprises providing the transmit announcement indication in a quality of service null (QoS-null) frame.

7. The method of claim 6, further comprising receiving, by the first station, an acknowledgement (ACK) frame from the second station after the first station has transmitted the transmit announcement indication with the QoS-null frame.

8. The method of claim 7, further comprising transmitting the second communication frame associated with the transmit announcement indication.

9. The method of claim 1, wherein providing the transmit announcement indication comprises providing the transmit announcement indication with a clear to send (CTS) frame.

10. The method of claim 9, further comprising transmitting the second communication frame associated with the transmit announcement indication.

11. A non-transitory computer-readable medium having instructions stored thereon that, if executed by a computing device, cause the computing device to perform operations comprising:
    transmitting a first communication frame from a first station to a second station;
    wherein the first communication frame comprises an address of the second station and a transmit announcement indication indicating that a second communication frame intended for the second station will follow the first communication frame and that the second communication frame will not include the address of the second station, and wherein the second communication frame follows after a short inter frame space (SIFS) after the first communication frame with the transmit announcement indication.

12. The computer-readable medium of claim 11, wherein the transmit announcement indication comprises a zero-length frame.

13. The computer-readable medium of claim 11, wherein transmitting the first communication frame comprises providing the transmit announcement indication with a request to send (RTS) frame.

14. The computer-readable medium of claim 13, wherein the operations further comprise receiving a clear to send (CTS) frame from the second station after the first station has transmitted the transmit announcement indication with the RTS frame.

15. The computer-readable medium of claim 14, wherein the operations further comprise transmitting the second communication frame associated with the transmit announcement indication.

16. A system comprising:
    a transmitter configured to:
       transmit a first communication frame from a first station to a second station;

wherein the first communication frame comprises an address of the second station and a transmit announcement indication indicating that a second communication frame intended for the second station will follow the first communication frame and that the second communication frame will not include the address of the second station, and wherein the second communication frame follows after a short inter frame space (SIFS) after the first communication frame with the transmit announcement indication.

17. The system of claim 16, wherein the transmit announcement indication comprises a zero-length frame.

18. The system of claim 16, wherein the transmitter is further configured to provide the transmit announcement indication with a request to send (RTS) frame.

19. The system of claim 18, further comprising a receiver configured to receive, by the first station, a clear to send (CTS) frame from the second station after the first station has transmitted the transmit announcement indication with the RTS frame.

20. The system of claim 19, wherein the transmitter is further configured to transmit the second communication frame associated with the transmit announcement indication.

21. The system of claim 16, wherein the first station comprises one of a wireless radio, desktop computer, portable computer, laptop computer, multi-media players, personal digital assistant (PDA), printer, fax machine, scanner, hub, switch, router, set-top box, and television with communication capability.

22. The method of claim 1, wherein the second communication frame comprises a physical layer (PHY) header without a media access control (MAC) portion.

23. The method of claim 1, wherein the transmit announcement indication comprises a bit inside a MAC header field.

24. The method of claim 23, wherein the bit comprises an high throughput-control field.

25. The method of claim 1, wherein the transmit announcement indication is located within one of a data frame, a management frame, or a control frame.

26. The method of claim 1, wherein the transmit announcement indication precedes a zero-length frame.

27. A method comprising:
receiving a first communication frame from a first station at a second station, wherein the first communication frame includes an address of the second station and a transmit announcement indication that indicates that a second communication frame intended for the second station will follow the first communication frame and that the second communication frame will not include the address of the second station; and
receiving, at the second station, the second communication frame after a short inter frame space (SIFS) that follows the first communication frame.

28. The method of claim 27, wherein the transmit announcement indication comprises a zero-length frame.

29. The method of claim 27, wherein receiving the first communication frame comprises receiving the transmit announcement indication with a request to send (RTS) frame.

30. The method of claim 29, further comprising transmitting a clear to send (CTS) frame from the second station to the first station in response to receiving the RTS frame.

31. The method of claim 27, wherein receiving the first communication frame comprises receiving the transmit announcement indication in a quality of service null (QoS-null) frame.

32. The method of claim 31, further comprising receiving an acknowledgement (ACK) frame at the second station from the first station.

33. The method of claim 27, wherein receiving the first communication frame comprises receiving the transmit announcement indication with a clear to send (CTS) frame.

34. A non-transitory computer-readable medium having instructions stored thereon that, if executed by a computing device, cause the computing device to perform operations comprising:
receiving a first communication frame from a first station, wherein the first communication frame includes an address of a second station and a transmit announcement indication that indicates that a second communication frame will follow the first communication frame and that the second communication frame will not include the address of the second station; and
receiving, at the second station, the second communication frame after a short inter frame space (SIFS) that follows the first communication frame.

35. The computer-readable medium of claim 34, wherein the transmit announcement indication comprises a zero-length frame.

36. The computer-readable medium of claim 34, wherein the receiving the first communication frame comprises receiving the transmit announcement indication with a request to send (RTS) frame.

37. The computer-readable medium of claim 36, wherein the operations further comprise transmitting a clear to send (CTS) frame to the first station in response to the RTS frame.

38. A system comprising:
a receiver configured to:
receive a first communication frame from a first station at a second station, wherein the first communication frame includes an address of the second station and a transmit announcement indication that indicates that a second communication frame intended for the second station will follow the first communication frame and that the second communication frame will not include the address of the second station; and
receive the second communication frame after a short inter frame space (SIFS) that follows the first communication frame.

39. The system of claim 38, wherein the transmit announcement indication comprises a zero-length frame.

40. The system of claim 39, wherein the receiver is further configured to receive the transmit announcement indication with a request to send (RTS) frame.

41. The system of claim 40, further comprising a transmitter configured to transmit a clear to send (CTS) frame from the second station to the first station in response to the RTS frame.

42. The system of claim 38, wherein the second station comprises one of a wireless radio, desktop computer, portable computer, laptop computer, multi-media players, personal digital assistant (PDA), printer, fax machine, scanner, hub, switch, router, set-top box, and television with communication capability.

* * * * *

UNITED STATES PATENT AND TRADEMARK OFFICE
CERTIFICATE OF CORRECTION

| | | |
|---|---|---|
| PATENT NO. | : 8,594,122 B2 | Page 1 of 1 |
| APPLICATION NO. | : 11/627181 | |
| DATED | : November 26, 2013 | |
| INVENTOR(S) | : Wentink | |

It is certified that error appears in the above-identified patent and that said Letters Patent is hereby corrected as shown below:

In the Specifications

In Column 2, Line 47, delete "FIG. 1" and insert -- FIG. 1. --, therefor.

In Column 2, Line 60, delete "NoACK" and insert -- No ACK --, therefor.

In Column 5, Lines 22-23, delete "an CTS" and insert -- a CTS --, therefor.

In Column 5, Line 29, delete "TXA" and insert -- TxA --, therefor.

In the Claims

In Column 9, Lines 36-37, in Claim 24, delete "an high" and insert -- a high --, therefor.

Signed and Sealed this
Sixth Day of May, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,594,122 B2 | Page 1 of 1 |
| APPLICATION NO. | : 11/627181 | |
| DATED | : November 26, 2013 | |
| INVENTOR(S) | : Wentink | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1372 days.

Signed and Sealed this
Twenty-first Day of April, 2015

Michelle K. Lee
*Director of the United States Patent and Trademark Office*